United States Patent
Bae et al.

(10) Patent No.: US 10,733,774 B2
(45) Date of Patent: Aug. 4, 2020

(54) DEVICE AND METHOD OF DISPLAYING HEAT MAP ON PERSPECTIVE DRAWING

(71) Applicant: HANWHA TECHWIN CO., LTD., Seongnam-si (KR)

(72) Inventors: Soon Min Bae, Changwon-si (KR); Yeon Geol Ryu, Changwon-si (KR)

(73) Assignee: HANWHA TECHWIN CO., LTD., Seongnam-si (KR)

( * ) Notice: Subject to any disclaimer, the term of this patent is extended or adjusted under 35 U.S.C. 154(b) by 284 days.

(21) Appl. No.: 14/790,224

(22) Filed: Jul. 2, 2015

(65) Prior Publication Data
US 2016/0163075 A1 Jun. 9, 2016

(30) Foreign Application Priority Data
Dec. 5, 2014 (KR) .................. 10-2014-0174257

(51) Int. Cl.
*G06T 11/20* (2006.01)
*G06K 9/00* (2006.01)
(Continued)

(52) U.S. Cl.
CPC ........ *G06T 11/206* (2013.01); *G06K 9/00362* (2013.01); *G06T 7/292* (2017.01);
(Continued)

(58) Field of Classification Search
CPC ..... G06T 11/206; G06T 7/292; G06T 15/205; G06T 2207/30242; G06T 2207/30241;
(Continued)

(56) References Cited

U.S. PATENT DOCUMENTS

| 8,350,908 B2 * | 1/2013 | Morris | G06K 9/00295 348/143 |
| 8,599,266 B2 * | 12/2013 | Trivedi | G06K 9/00234 348/143 |

(Continued)

FOREIGN PATENT DOCUMENTS

| CN | 102834848 A | 12/2012 |
| CN | 103931172 A | 7/2014 |

(Continued)

OTHER PUBLICATIONS

Photography Stack Exchange, "How do I calculate the distance of an object in a photo?" questions answered 2011-2014, https://photo.stackexchange.com/questions/12434/how-do-i-calculate-the-distance-of-an-object-in-a-photo (Year: 2011).*

(Continued)

*Primary Examiner* — Anner N Holder
*Assistant Examiner* — Jill D Sechser
(74) *Attorney, Agent, or Firm* — Sughrue Mion, PLLC

(57) ABSTRACT

An apparatus for displaying a heat map on a perspective drawing includes an object detector configured to detect an object via at least one camera, a horizontal distance calculator configured to calculate a horizontal distance between the detected object and the at least one camera, an object display configured to display the detected object on the perspective drawing based on the calculated horizontal distance, and a heat-map display configured to display the heat map according to a trace density of the object displayed on the perspective drawing.

17 Claims, 9 Drawing Sheets

(51) Int. Cl.
  *G06T 15/20* (2011.01)
  *H04N 7/18* (2006.01)
  *G06T 7/292* (2017.01)
(52) U.S. Cl.
  CPC ............ *G06T 15/205* (2013.01); *H04N 7/181*
    (2013.01); *G06T 2207/10021* (2013.01); *G06T*
    *2207/30196* (2013.01); *G06T 2207/30232*
    (2013.01); *G06T 2207/30241* (2013.01); *G06T*
    *2207/30242* (2013.01)
(58) Field of Classification Search
  CPC . G06T 2207/10021; G06T 2207/30196; G06T
      2207/30232; H04N 7/181; G06K 9/00362
  See application file for complete search history.

(56) References Cited

U.S. PATENT DOCUMENTS

| | | | | |
|---|---|---|---|---|
| 2001/0010542 | A1* | 8/2001 | Takagi | .................. G01S 3/7864 348/152 |
| 2003/0085992 | A1* | 5/2003 | Arpa | ..................... G06L 15/205 348/47 |
| 2007/0024704 | A1* | 2/2007 | Lin | ........................... G06T 7/80 348/135 |
| 2012/0056992 | A1* | 3/2012 | Kuroda | ................. G06T 19/006 348/46 |
| 2012/0314030 | A1* | 12/2012 | Datta | ....................... G06T 7/62 348/44 |
| 2012/0327220 | A1* | 12/2012 | Ma | ........................ H04N 5/232 348/135 |
| 2013/0063592 | A1 | 3/2013 | Kingsley | |
| 2013/0094703 | A1 | 4/2013 | Gottschlag | |
| 2014/0112537 | A1 | 4/2014 | Frank et al. | |
| 2014/0164029 | A1 | 6/2014 | Kwak et al. | |
| 2015/0304568 | A1* | 10/2015 | Ikeda | ................. H04N 5/23222 348/222.1 |

FOREIGN PATENT DOCUMENTS

| | | |
|---|---|---|
| CN | 103959278 A | 7/2014 |
| JP | 2009145061 A | 7/2009 |
| KR | 101080073 B1 | 11/2011 |
| KR | 101362630 B1 | 2/2014 |
| KR | 1020140073773 A | 6/2014 |

OTHER PUBLICATIONS

Shapiro, Linda G. et al., "Computer Vision", Mar. 2005, Version 1, Beijing China Machine Press, pp. 291-292. (7 pages total).

Office Action dated Jan. 31, 2019 by the State Intellectual Property Office of P.R. China in counterpart Chinese Patent Application No. 201510888714.5.

Communication dated Dec. 16, 2019 issued by the State Intellectual Property Office of P.R. China in counterpart Chinese Application No. 201510888714.5.1.

* cited by examiner

DEVICE AND METHOD OF DISPLAYING HEAT MAP ON PERSPECTIVE DRAWING

CROSS-REFERENCE TO THE RELATED APPLICATION

This application claims priority from Korean Patent Application No. 10-2014-0174257, filed on Dec. 5, 2014, in the Korean Intellectual Property Office, the disclosure of which is incorporated herein in its entirety by reference.

BACKGROUND

1. Field

Apparatuses and methods consistent with exemplary embodiments relate to displaying a heat map on a perspective drawing.

2. Description of the Related Art

A host device of a camera in a surveillance system needs to obtain and display a distance between the camera and a target. For example, if cameras included in a surveillance system work in cooperation with one another to track a target such as a vehicle, the surveillance system may need to display a distance between the target and the cameras that are currently capturing an image of the target.

SUMMARY

One or more exemplary embodiments provide a method of correcting a distortion that may occur in an image captured by a surveillance camera, displaying an image obtained by correcting the distortion of the image on a perspective drawing, and providing a correct heat map by using information about the displayed image.

Various aspects will be set forth in part in the description which follows and, in part, will be apparent from the description, or may be learned by practice of the presented embodiments.

According to one or more exemplary embodiments, there is provided an apparatus for displaying a heat map on a perspective drawing which may include: an object detector configured to detect an object via at least one camera; a horizontal distance calculator configured to calculate a horizontal distance between the detected object and the at least one camera; an object display configured to display the detected object on the perspective drawing based on the calculated horizontal distance; and a heat-map display configured to display a heat map according to a trace density of the object displayed on the perspective drawing.

According to one or more exemplary embodiments, the apparatus for displaying a heat map on a perspective drawing may further include: a tracker configured to track eyes or hands of the detected object detected via the at least one camera; and a perspective drawing generator configured to generate the perspective drawing based on an image captured by the at least one camera. Here, the heat-map display may be further configured to display on the perspective drawing a path via which eye or hand tracking is performed on the detected object, or the heat map according to the trace density of the detected object which is obtained by performing the eye or hand tracking.

According to one or more exemplary embodiments, there is provided a method of displaying a heat map on a perspective drawing which may include: detecting an object via at least one camera; calculating a horizontal distance between the detected object and the at least one camera; displaying the detected object on the perspective drawing based on the calculated horizontal distance; and displaying the heat map according to a trace density of the object displayed on the perspective drawing.

According to one or more exemplary embodiments, the method of displaying a heat map on a perspective drawing may further include: tracking eyes or hands of the detected object detected via the at least one camera; generating the perspective drawing based on an image captured by the at least one camera; and displaying on the perspective drawing a path via which eye or hand tracking is performed on the detected object, or the heat map according to the trace density of the detected object which is obtained by performing the eye or hand tracking.

BRIEF DESCRIPTION OF THE DRAWINGS

These and/or other aspects will become apparent and more readily appreciated from the following description of the embodiments, taken in conjunction with the accompanying drawings in which:

FIG. 4 illustrates a case when an optical axis of the optical system is parallel to a ground surface. FIG. 5 illustrates a case when the optical axis of the optical system is not parallel to a ground surface.

DETAILED DESCRIPTION OF THE EXEMPLARY EMBODIMENTS

Figure 1:
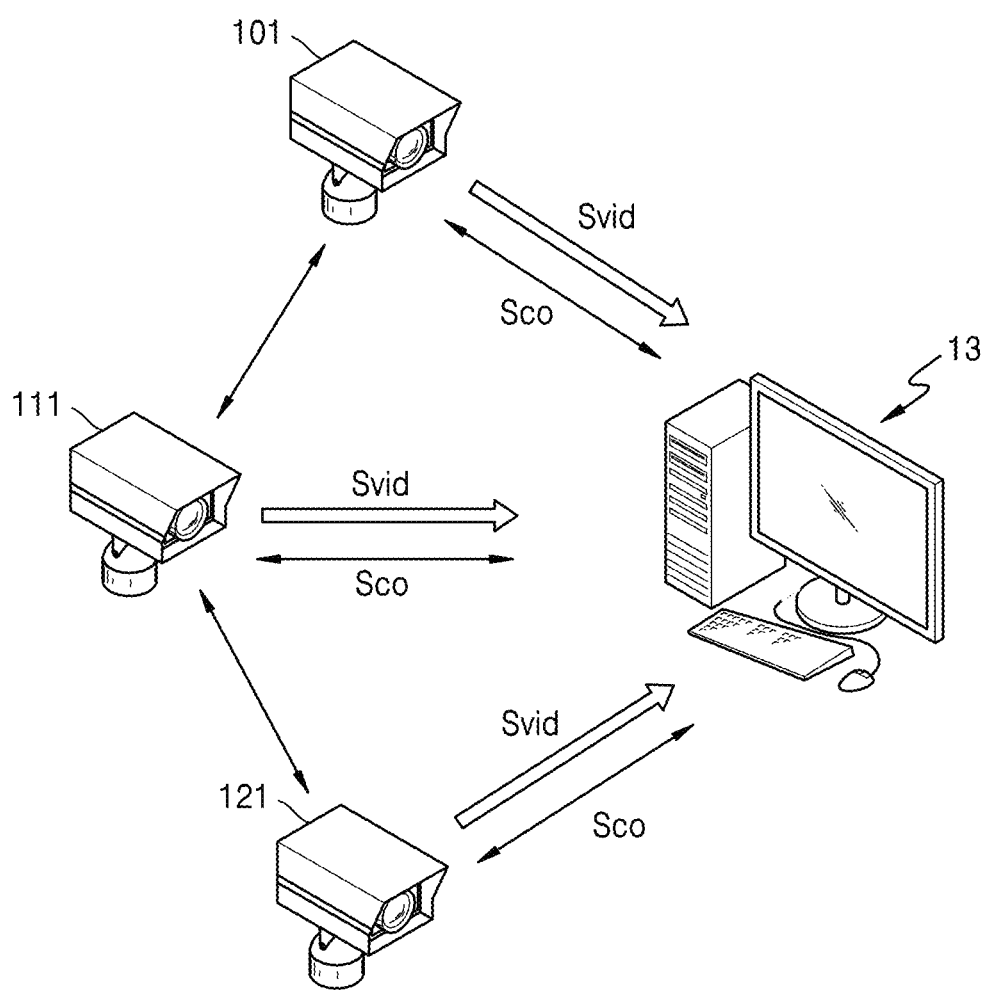
FIG. 1 illustrates an example of a system using a method for displaying a heat map on a perspective drawing, the method being performed by a terminal, according to an exemplary embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the exemplary embodiments are merely described below, by referring to the drawings, to explain various aspects of the inventive concept. Expressions such as "at least one of," when preceding a list of elements, modify the entire list of elements and do not modify the individual elements of the list.

The following description and accompanying drawings are provided for better understanding of the inventive concept. In the following description, well-known functions or constructions are not described in detail if it is determined that they would obscure the inventive concept due to unnecessary detail.

The following description and drawings are not intended to restrict the scope of the inventive concept, and the scope of the inventive concept should be defined by the appended claims. The terms used in the following description are merely used to describe particular exemplary embodiments of the inventive concept and are not intended to limit the inventive concept.

Hereinafter, exemplary embodiments of the inventive concept will be described in detail with reference to the accompanying drawings.

FIG. 1 illustrates an example of a system used for displaying a heat map on a perspective drawing, according to an exemplary embodiment.

Referring to FIG. 1, a system used for displaying a heat map on a perspective drawing includes a plurality of cameras 101, 111, 121 and a terminal 13 which is connected to these cameras. The cameras 101, 111 and 121 may communicate with the terminal 13 to exchange a communication signal Sco with one another. Additionally, the cameras 101, 111 and 121 may exchange information with one another in wired or wireless communications.

The cameras 101, 111 and 121 may respectively transmit video signals Svid, each of which may be a signal taken out of a live view mode for video, to the terminal 13. Additionally, the cameras 101, 111 and 121 may be configured to generate a perspective drawing by exchanging the video signals Svid with one another.

The video signals Svid, received by the terminal 13, may be displayed on a display apparatus and stored in a recoding medium, for example, a hard-disk drive. Additionally, the terminal 13 may receive an input of a control signal from a user so as to pan, tilt, and zoom (PTZ) operations of the camera 101, 111 and 121.

Figure 2:
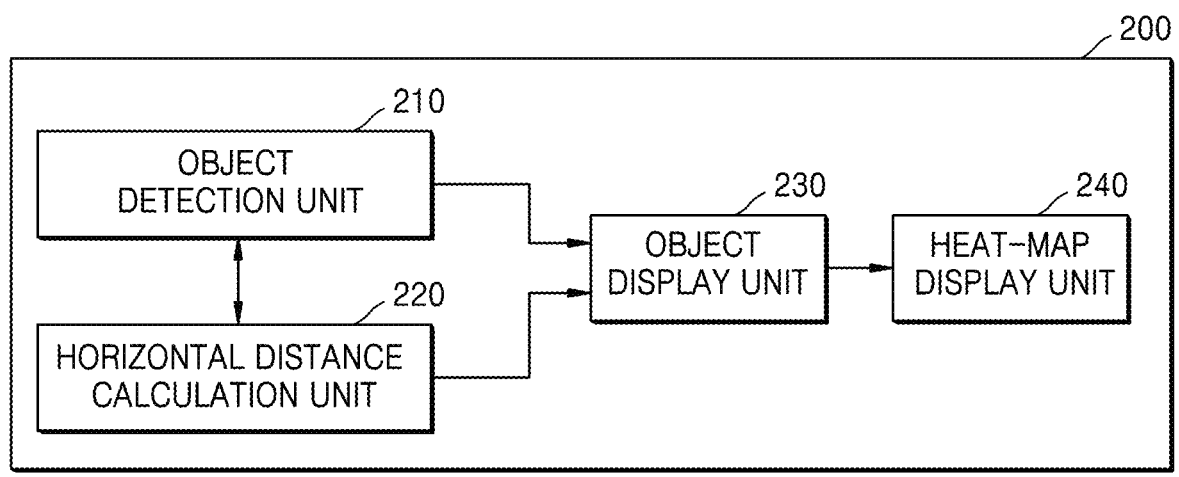
FIG. 2 illustrates an internal block diagram of a device for displaying a heat map on a perspective drawing that shows a particular area, according to an exemplary embodiment.
Figure 3:
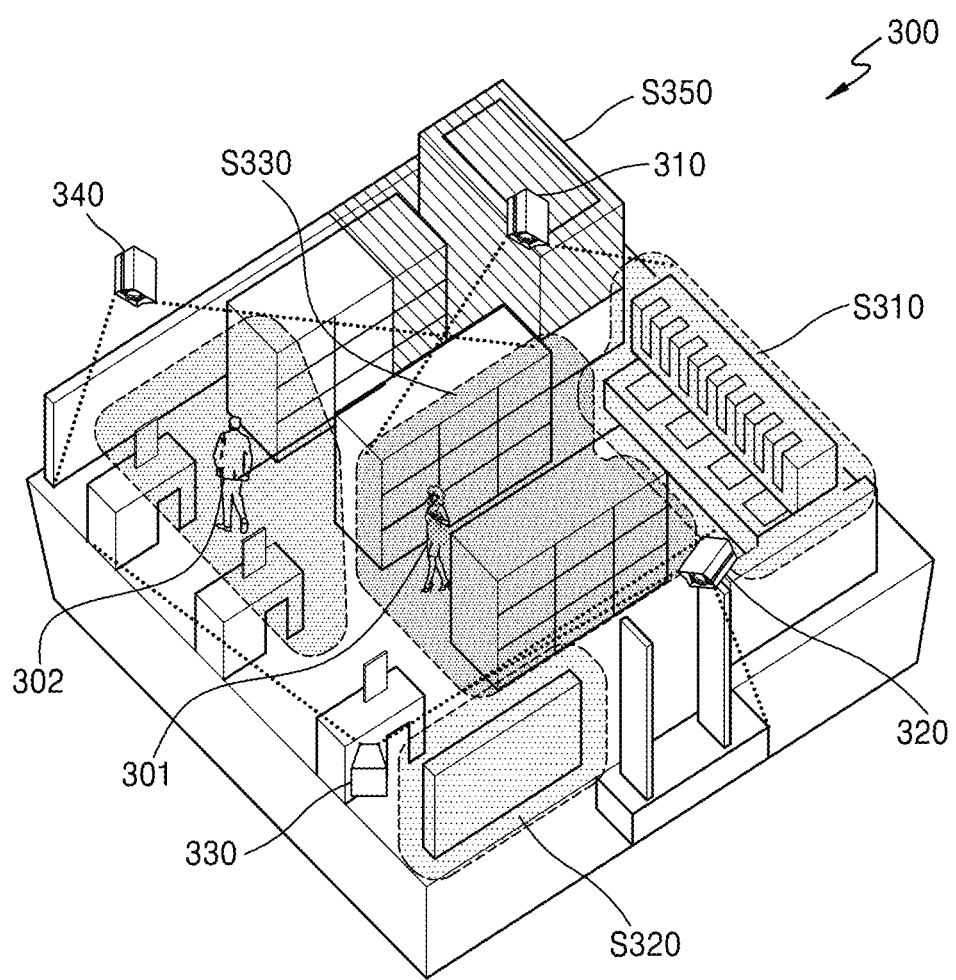
FIG. 3 illustrates an example of correcting distortion of an object photographed by a camera and displaying the corrected object on a perspective drawing with reference to a horizontal distance, according to an exemplary embodiment.

FIG. 2 is an internal block diagram of a device 200 for displaying a heat map on a perspective drawing of a particular area, according to an exemplary embodiment. Referring to FIG. 3, a configuration of the device 200 for displaying a heat map on a perspective drawing is described. FIG. 3 illustrates an example of correcting distortion of an object photographed by each camera, and displaying the corrected object on a perspective drawing with reference to a horizontal distance between the object and each camera, according to an exemplary embodiment.

A size of an object respectively detected by cameras 310 through 340 shown in FIG. 3 may be distorted according to a distance or an angle between the object and the cameras 310 through 340. As an example, when an object 301 is photographed by the cameras 310 through 340, the object 301 may appear large in an image taken by the camera 310 placed near the object 301, whereas the object 301 may appear small in an image taken by the camera 340 placed far away from the object 301.

According to an exemplary embodiment, the device 200 for displaying a heat map on a perspective drawing adjusts a size of an object detected by the cameras 310 through 340 by using a horizontal distance between the object and each camera, and displays the object having the adjusted size on the perspective drawing. By performing such a process, a distortion that may occur when an object is detected by using the cameras 310 through 340 may be corrected. According to an exemplary embodiment, the device 200 for displaying a heat map on a perspective drawing may correct distortion that may occur when objects are detected respectively by using the cameras 310 through 340 shown in FIG. 3, and then, display each object on the perspective drawing and provide a heat map according to a trace density of each object or according to a result of performing eye or hand tracking on each object.

According to an exemplary embodiment, the device 200 for displaying a heat map on a perspective drawing includes an object detector 210, a horizontal distance calculator 220, an object display 230, and a heat-map display 240.

According to an exemplary embodiment, a perspective drawing 300 of a particular area may be already present, or a perspective drawing may be generated by correcting a distortion of images captured by the cameras 310 through 340 shown in FIG. 3, and exchanging information about the captured images with the cameras 310 through 340 shown in FIG. 3. The perspective drawing may be generated in two dimensions or three dimensions.

The object detector 210 detects objects 301 and 302 by using at least one of the cameras 310 through 304 shown in FIG. 3. The at least one of the cameras 310 through 304 may be configured to track a moving path of the objects 301 and 302 or movement of eyes or hands of the objects 301 and 302.

The horizontal distance calculator 220 calculates a horizontal distance of the object detected by the object detector 210. As an example, if a particular object is detected by a plurality of cameras at a same time, a location and a size of the particular object may be determined by triangulation. According to another exemplary embodiment, if a particular object is detected by a single camera, a horizontal distance therebetween may be calculated according to an exemplary embodiment described with reference to FIGS. 4 and 5. A method of calculating a horizontal distance between a camera and an object is described with reference to FIGS. 4 and 5. Additionally, according to an exemplary embodiment, various methods of calculating a horizontal distance between a camera and an object may be performed by the horizontal distance calculator 220.

The object detector 210 detects the objects and the object display 230 displays the detected objects on a default perspective drawing or on a newly created perspective drawing, using the horizontal distance calculated by the horizontal distance calculator 210.

According to an exemplary embodiment, the cameras 310 through 340 in different orientation exchange images about objects and the images are adjusted based on the horizontal distance information, and a new perspective drawing is created with the adjusted images of objects.

Referring to FIG. 3, locations where the camera 310 through 340 are installed and a range of an area photographed by each camera, as well as an object whose distortion is corrected with reference to the horizontal distance, are shown on the perspective drawing 300.

Additionally, if a particular area of the perspective drawing 300 is photographed by a plurality of cameras, the object display 300 may provide information about the particular area photographed by the plurality of cameras. The perspective drawing 300 shows information about ranges of areas S310 and S320 respectively photographed by a single camera, a range of an area S340 photographed by two cameras, and a range of an area S330 photographed by three cameras. Additionally, a dead-zone area S350 that is not photographed by any camera may be detected in the perspective drawing 300.

The object display 230 that displays the perspective drawing 330 may be configured to support a user interface so that a user may select each camera shown in the perspective drawing 330, or adjust a range of an area that is expected to be photographed if a location of a camera is to be changed.

The heat-map display 240 is configured to display a heat map according to a trace density of the object shown on the perspective drawing 300. The heat map is configured to output various information as color graphics on the perspective drawing 300 to show a thermal distribution.

The heat-map display 240 may further display a result of performing eye or hand tracking on the object on the perspective drawing 300. The eyes or hands of the object may be tracked and movement thereof may be displayed on the perspective drawing 300.

The heat-map display 240 may provide an image of a thermal distribution at a location or a location coordinate where the eyes or the hands of the object have been frequently tracked, by using information obtained by the tracking of the movement of the eyes or the hands of the object.

Figure 4:
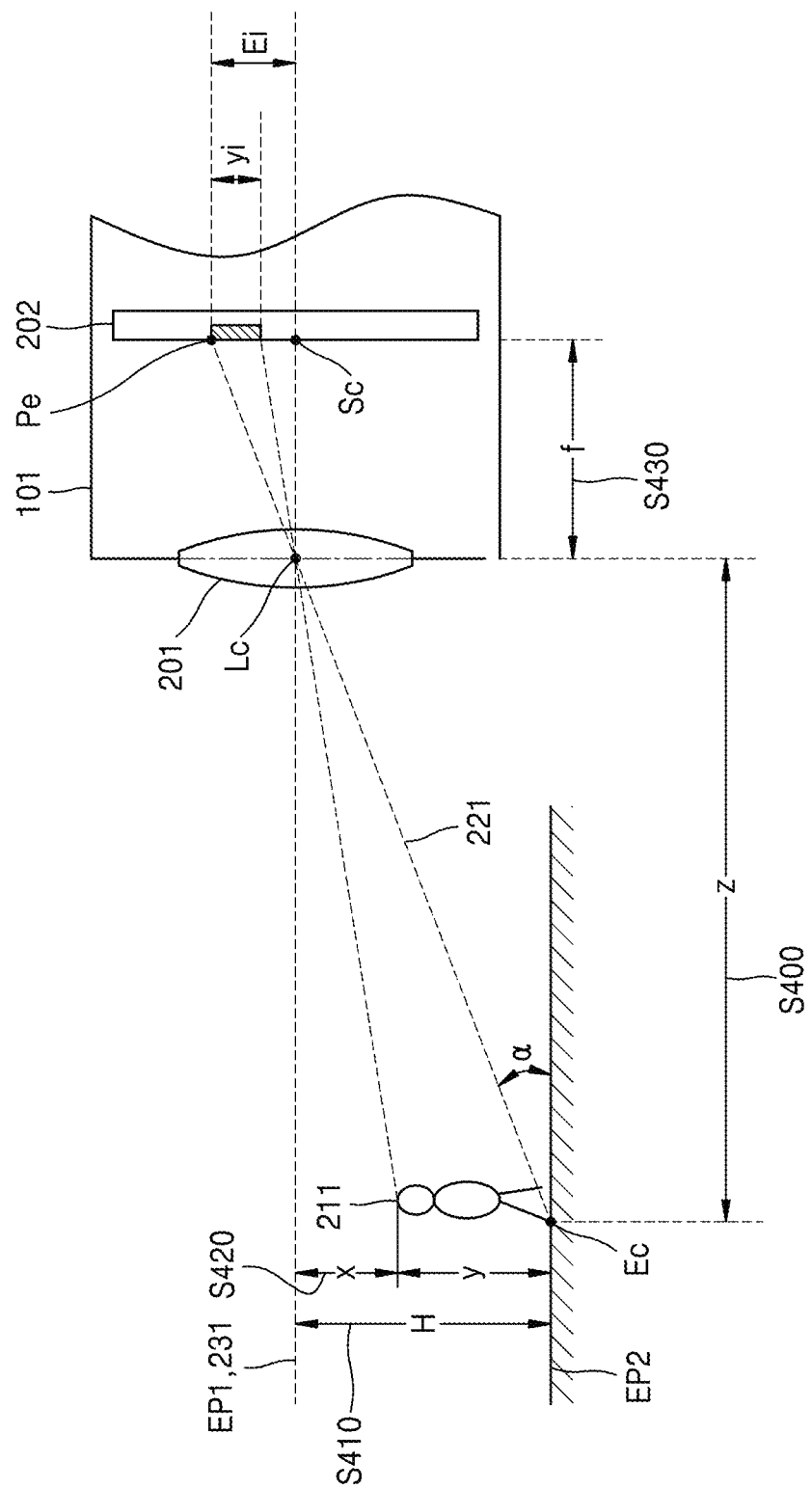
FIGS. 4 and 5 illustrate calculating a horizontal distance between the camera and an object, according to exemplary embodiments.
Figure 5:
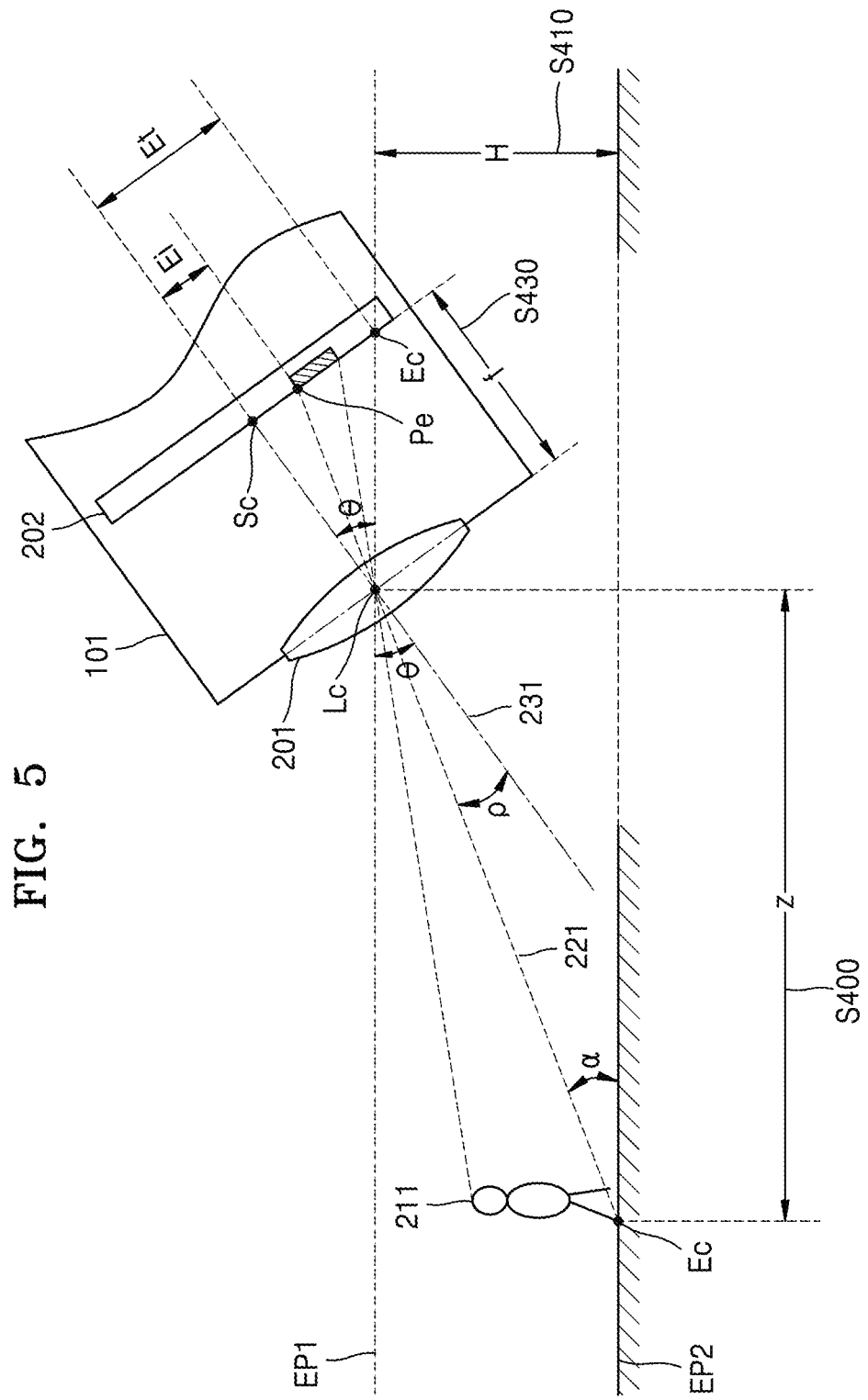

As shown an embodiment in FIGS. 4 and 5, a horizontal distance z between the camera 101 and a target in S400 may be calculated based on a height H of a camera from a ground surface EP2 in S410, a distance x between the target and a horizontal line EP1 in S420, and a focal length f in S430. The height H of the camera 101 from the ground surface EP2 may be set by a user who installs the camera 101. The height H may be a length between a center of the optical system 201, e.g. a center of a lens, Lc and the ground surface EP2.

FIG. 4 shows an example of calculating the horizontal distance z when an optical axis 231 of an optical system 201 is parallel to the ground surface EP2. FIG. 5 shows an example of calculating a horizontal distance when the optical axis 231 of the optical system 201 is not parallel to the ground surface EP2.

FIG. 4 illustrates the camera 101, the optical system 201, a photoelectric conversion device 202, a target 211, a straight line 221 connecting the camera 101 with the target 211, and an optical axis 231 of the optical system 201. Also, in FIG. 4, a denotes a relative angle of the target 211 with respect to the camera 101, α denotes a ground landing point of the target 211, Ei denotes a vertical length of an image, EP1 denotes the horizontal line, EP2 denotes the ground surface, f denotes a focal length, H denotes the height of the camera from the ground surface, Lc denotes a center of the optical system 201, Pe denotes a location of the target 211 in the image, Sc denotes a center of a sensor 202, y denotes a vertical length of the target 211, yi denotes a vertical length of the target 211 in the image, and z denotes a horizontal distance between the camera 101 and the target 211. Here, the relative angle of the target 211 with respect to the camera 101 may be represented by an angle between a virtual line connecting the bottommost end of the target 211 and the center of the lens of the optical system 201.

FIG. 4 shows a case when the optical axis 231 of the optical system 201 is parallel to the ground surface EP2. In this case, when the camera is level, the sensor central point Sc will be the horizontal line EP1 that meets the horizon. Equation 1 may be established as follows:

$$y:yi=z:f \quad \text{[Equation 1]}$$

Accordingly, the horizontal distance z between the camera 101 and the target 211 may be obtained from Equation 2 shown below:

$$z = \frac{y \times f}{yi} \quad \text{[Equation 2]}$$

FIG. 5 shows a case when the optical axis 231 of the optical system 201 is not parallel to the ground surface EP2. Same reference numerals shown in FIG. 5 as those shown in FIG. 4 denote same elements. In FIG. 5, Pe denotes a location of the target 211 in the image, Eh denotes a sensor horizontal point, when a straight line parallel to the ground is extended from the central point of the optical system of the camera, the sensor horizontal point Eh refers to a point where an extended line reaches the photoelectric conversion device, and a reference numeral Et denotes a sensor tilting distance which is the vertical distance between the sensor central point Sc and the sensor horizontal point Eh, θ denotes an angle between the ground surface EP1 and an optical axis of the camera 101, and p denotes an angle between the optical axis of the camera 101 and the target 211.

A camera or a terminal sets a difference between the ground-camera angle θ between the ground surface EP1 and the camera 101 and the camera-target angle ρ between the target 211 and the camera 101 as the relative target angle α between the target 211 and the camera 101. The relative target angle α may be calculated by using set values of parameters of the camera 101, as shown in Equation 2 below.

$$\alpha = \theta - \rho \quad \text{[Equation 3]}$$

The camera 101 or a terminal sets a value, obtained by dividing a value of the height H of the camera 101 from the ground surface by a tangent value $\tan^{-1}\alpha$ of the relative angle α of the target 211 with respect to the camera 101, as a value of the horizontal distance z between the camera 101 and the target 211.

The horizontal distance z between the camera 101 and the target 211 may be obtained by using Equation 4 shown below:

$$z = \frac{H}{\tan^{-1}\alpha} \quad \text{[Equation 4]}$$

Figure 6:
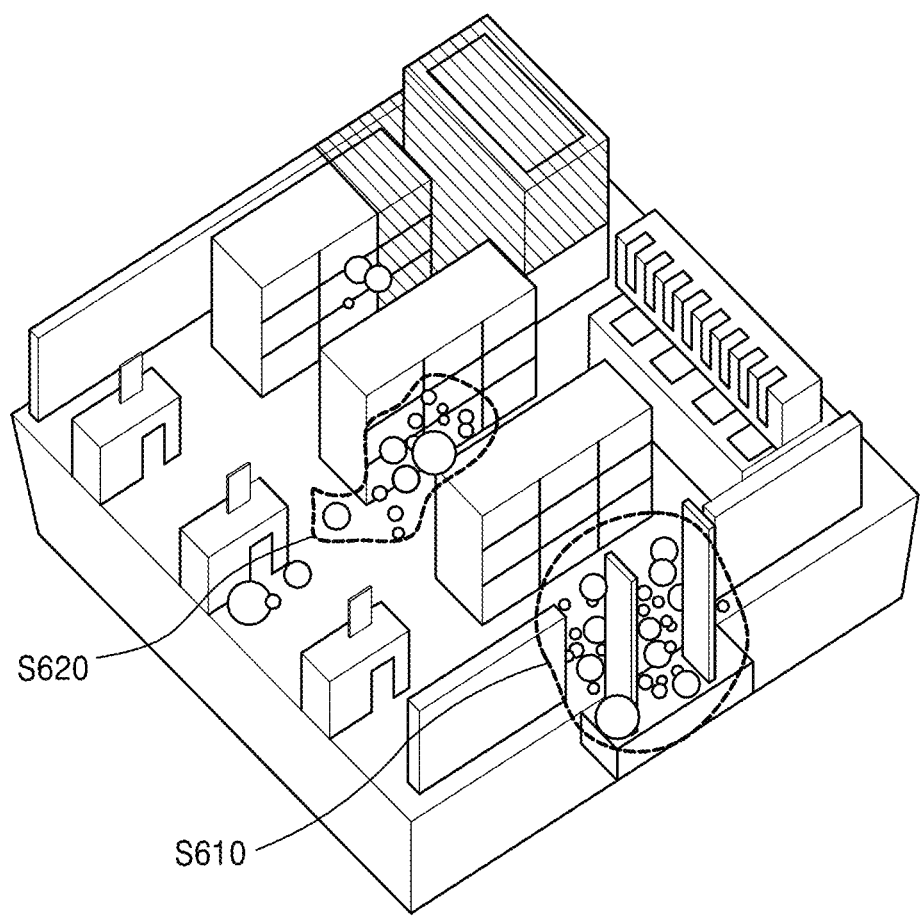
FIGS. 6 and 7 illustrate an example of displaying a heat map on a perspective drawing, the displaying being performed by the terminal, according to an exemplary embodiment.
Figure 7:
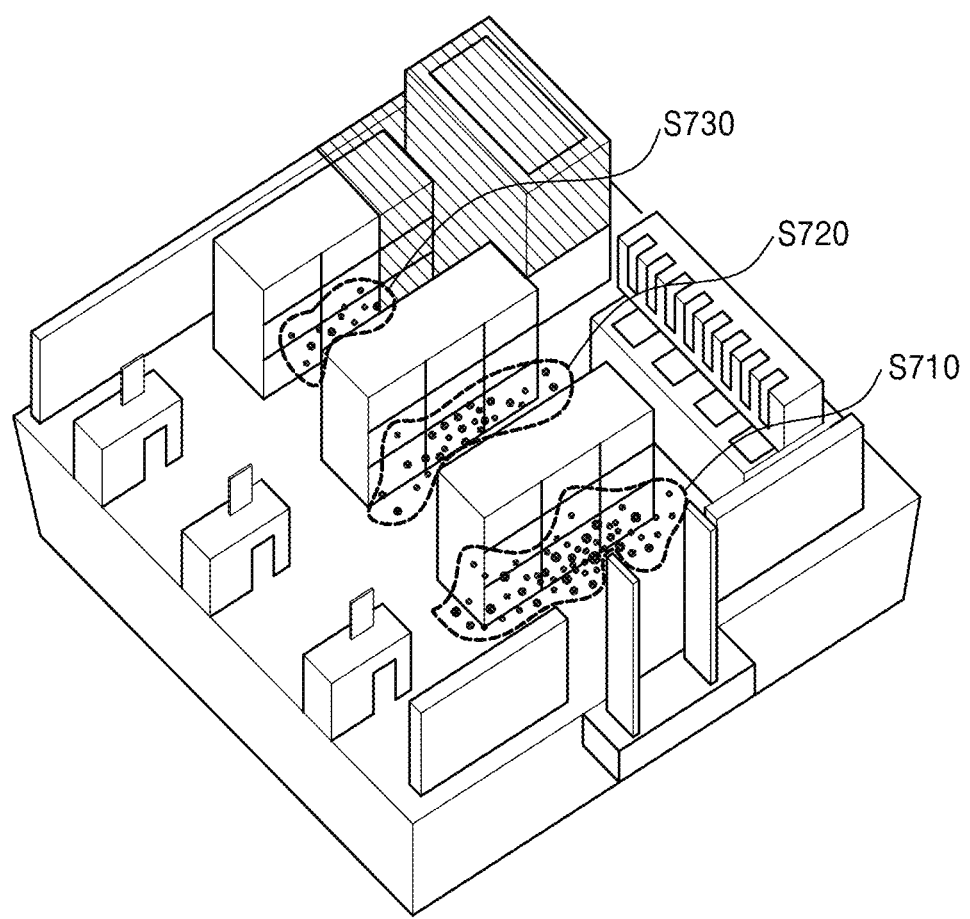

FIGS. 6 and 7 illustrate an example of displaying a heat map on a perspective drawing by the terminal, according to an exemplary embodiment.

FIG. 6 shows an exemplary embodiment of displaying a heat map on a perspective drawing according to a trace density of objects by the terminal, according to an exemplary embodiment. As presented in FIG. 6, the density of the objects is the highest in an entrance area in S610 followed by a central area in S620.

A manager may further install a camera in the entrance area in S610 where the objects are crowded, with reference to the heat map. Additionally, an important notification may be posted at the entrance area in S610 or a product to be sold may be displayed in the entrance area in S610, by using information about the area in S610 where the objects are crowded.

FIG. 7 shows an exemplary embodiment of displaying a heat map on a perspective drawing based on a trace density of objects obtained by performing eye tracking or hand tracking on the objects, according to an exemplary embodiment. Referring to FIGS. 6 and 7, it may be understood that area in S710 and S720 where the trace density obtained as a result of the eye or hand tracking is high, which are shown in FIG. 7, are different from the areas in S610 and S620 where the density of the objects is high, which are shown in FIG. 6.

A manager may use such information to display products that the objects are likely to buy together with products that are promoted for sale in the area in S710 and S720 where the trace density obtained as a result of the eye or hand tracking is high, shown in FIG. 7.

Figure 8:
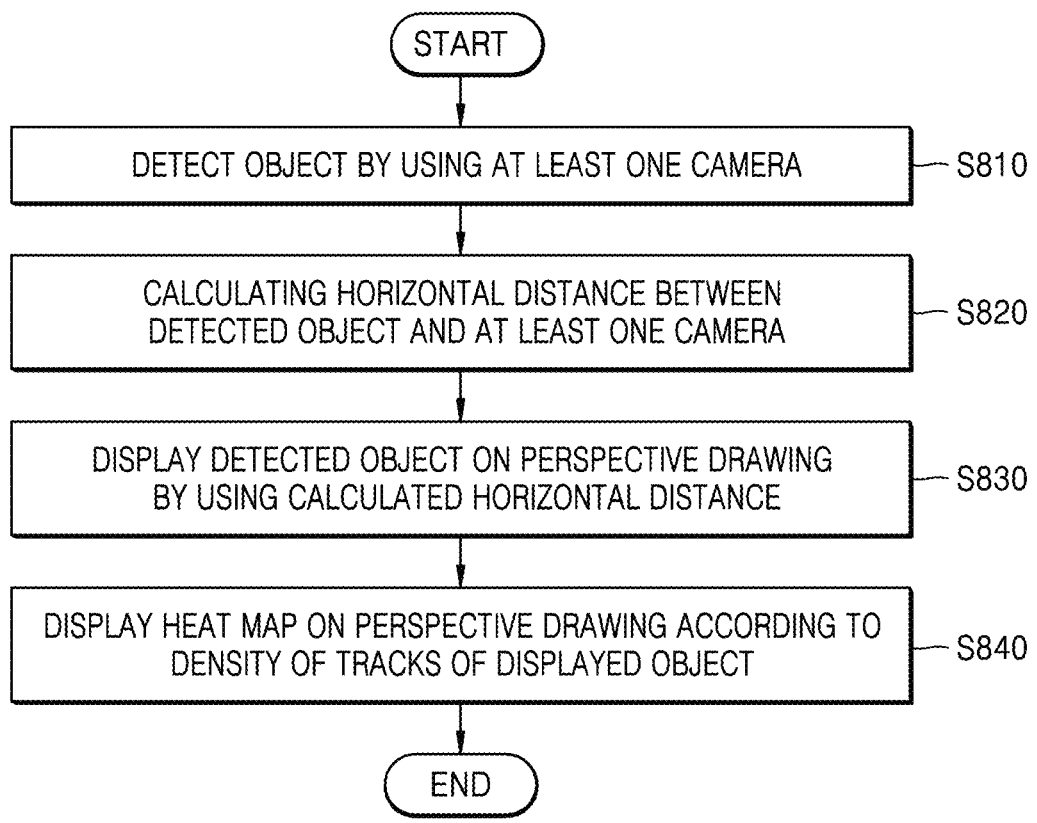
FIGS. 8 and 9 illustrate flowcharts of a method of displaying a heat map on a perspective drawing, the method being performed by the terminal, according to an exemplary embodiment.

FIG. 8 illustrates a flowchart of a method of displaying a heat map on a perspective drawing by a terminal, according to an exemplary embodiment.

In S810, at least one camera installed in a particular area detects an object moving in the particular area. In this case, the at least one camera may perform tracking on eyes or hands of the detected object. Then, in operation S820, the terminal calculates a horizontal distance between the at least one camera and the detected object by using information about the object and information about a captured image which are received from the at least one camera. An embodiment of calculating the horizontal distance is described with reference FIGS. 4 and 5.

In operation S830, the terminal displays the detected object on the perspective drawing 300 shown in FIG. 3. In this case, the detected object is displayed such that a size and a location of the detected object, which were distorted when photographed by the at least one camera, are corrected. In operation S840, the terminal displays a heat map on the perspective drawing 300 according to a trace density of the object.

It is described with reference to FIG. 8 that operations S830 and S840 are processed sequentially. However, it is to be noted that the terminal may be configured to perform operation S830 and S840 at a same time, or perform operation S830 without having to perform operation S840.

Figure 9:
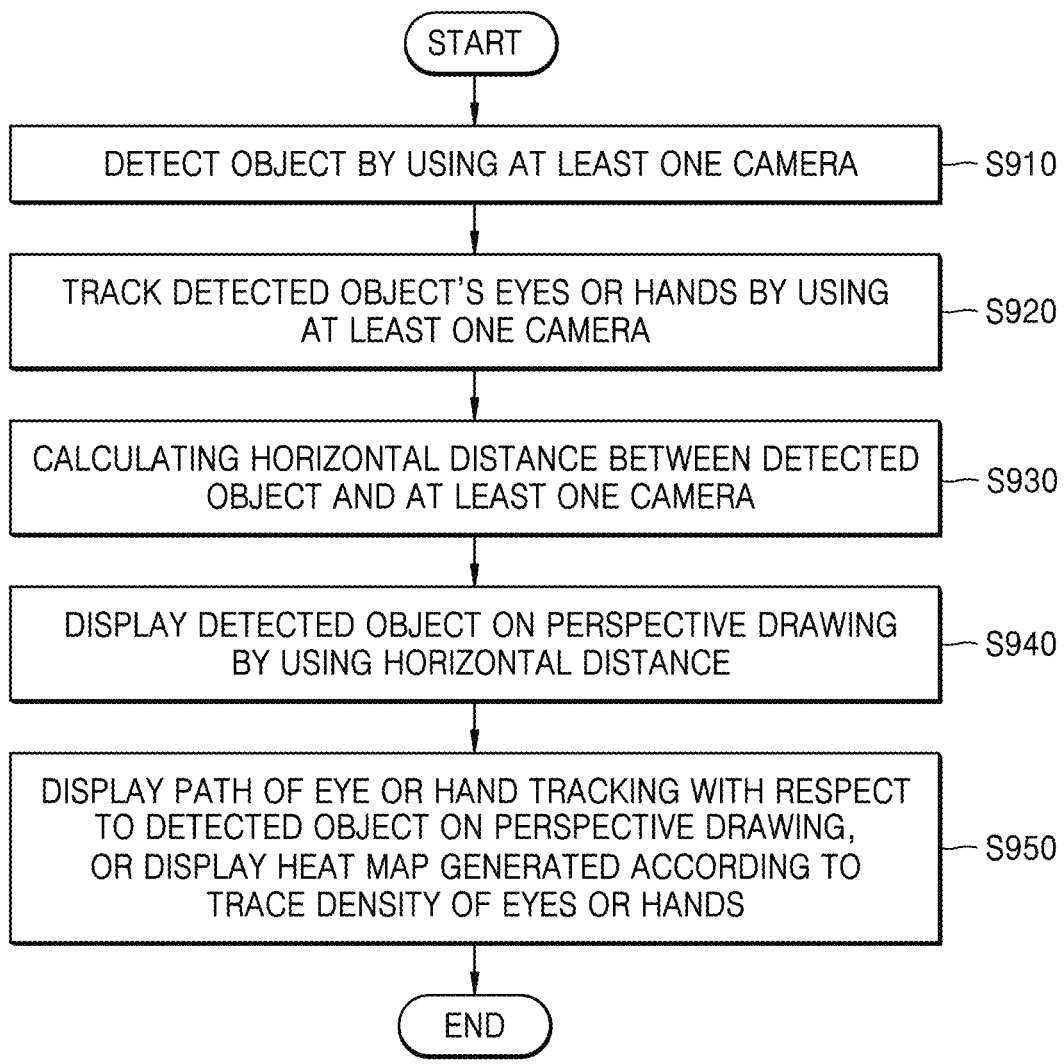

FIG. 9 is a flowchart of a method of displaying a heat map on a perspective drawing by a terminal, according to another exemplary embodiment.

In S910, at least one camera installed in a particular area detects an object moving in the particular area. In this case, in operation S920, the at least one camera may perform tracking on eyes or hands of the detected object. Then, in operation S930, the terminal calculates a horizontal distance between the at least one camera and the detected object by using information about the object and information about a captured image which are received from the at least one camera. An embodiment of calculating the horizontal distance is described with reference FIGS. 4 and 5.

The at least one camera installed in the particular area may exchange information about the captured image and information about the detected object with one another. According to an exemplary embodiment, in operation S940, a perspective drawing may be generated by using exchanged information between at least one camera installed in a particular area. It is described with reference to FIG. 9 that operation S940 is performed after operations S910 through and S930 are performed. However, operation S940 may be performed before operations S910 through and S930 are performed. Alternatively, operation S940 may be performed together with operations S910 through S930.

By performing such process, the perspective drawing of the particular area photographed by the at least one camera is generated. Then, if the object moving in the particular area is detected, the detected object is displayed by using a horizontal distance between the detected object and the at least one camera.

In this case, in operation S950, the perspective drawing comes with an adjusted size and location of the detected object by using horizontal distance information, which eliminates the distortion of the images transmitted from cameras in different orientation. In operation S950, the terminal displays a path of the eyes or hands of the detected object, on which the tracking was performed, on the perspective drawing, or displays a heat map according to a trace density of the eyes or hands of the detected object on which the tracking was performed. The terminal may also display a heat map according to a trace density of the object in operation S960.

The operations or steps of the process described above in reference to FIGS. 8 and 9 can be embodied as computer readable codes on a computer readable recording medium, or to be transmitted through a transmission medium. The computer readable recording medium is any data storage device that can store data which can be thereafter read by a computer system. Examples of the computer readable recording medium include read-only memory (ROM), random-access memory (RAM), compact disc (CD)-ROM, digital versatile disc (DVD), magnetic tape, floppy disk, and optical data storage device, not being limited thereto. The transmission medium can include carrier waves transmitted through the Internet or various types of communication channel. The computer readable recording medium can also be distributed over network coupled computer systems so that the computer readable code is stored and executed in a distributed fashion.

At least one of the components, elements or units represented by a block as illustrated in FIG. 2 may be embodied as various numbers of hardware, software and/or firmware structures that execute respective functions described above, according to an exemplary embodiment. For example, at least one of these components, elements or units may use a direct circuit structure, such as a memory, processing, logic, a look-up table, etc. that may execute the respective functions through controls of one or more microprocessors or other control apparatuses. Also, at least one of these components, elements or units may be specifically embodied by a module, a program, or a part of code, which contains one or more executable instructions for performing specified logic functions, and executed by one or more microprocessors or other control apparatuses. Also, at least one of these components, elements or units may further include a processor such as a central processing unit (CPU) that performs the respective functions, a microprocessor, or the like. Two or more of these components, elements or units may be combined into one single component, element or unit which performs all operations or functions of the combined two or more components, elements of units. Also, at least part of functions of at least one of these components, elements or units may be performed by another of these components, element or units. Further, although a bus is not illustrated in the above block diagrams, communication between the components, elements or units may be performed through the bus. Functional aspects of the above exemplary embodiments may be implemented in algorithms that execute on one or more processors. Furthermore, the components, elements or units represented by a block or processing steps may employ any number of related art techniques for electronics configuration, signal processing and/or control, data processing and the like As described above, according to the above exemplary embodiments, an image may be captured by a surveillance camera and displayed on a perspective drawing after a distortion of the image is corrected, and thus, a correct heat map may be displayed by using information about the image displayed on the perspective drawing.

It should be understood that the exemplary embodiments described therein should be considered in a descriptive sense only and not for purposes of limitation. Descriptions of features or aspects within each embodiment should typically be considered as available for other similar features or aspects in other embodiments.

While one or more exemplary embodiments have been described with reference to the figures, it will be understood by those of ordinary skill in the art that various changes in form and details may be made therein without departing from the spirit and scope of the inventive concept as defined by the following claims.

What is claimed is:

1. An apparatus for displaying a heat map on a perspective drawing, the apparatus comprising:
    at least one processor configured to:
        detect an object from images captured by a plurality of cameras having different orientations; and
        calculate a horizontal distance between the detected object and each of the cameras;
    an object display configured to display the detected object on the perspective drawing based on the calculated horizontal distance; and
    a heat-map display configured to display the heat map according to a trace density of at least one object including the object displayed on the perspective drawing,
    wherein the at least one processor is further configured to adjust a size of the detected object using the horizontal distance, and generate the perspective drawing on which the detected object, of which the size is adjusted, is shown,
    wherein the at least one processor is further configured to calculate a horizontal distance between the detected object and a camera among the cameras based on a height of the detected object on a ground surface, a height of the detected object in an image captured by the camera and a focal length of the camera,
    wherein an optical axis of the camera is parallel with the ground surface,
    wherein the perspective drawing highlights a dead zone which is included in a particular area but is not included in photographing areas of the cameras, and
    wherein the cameras are configured to exchange live view video signals between each other, and generate a perspective drawing based on the exchanged live view video signals.

2. The apparatus of claim 1, wherein the perspective drawing comprises preset information about a map indicating the particular area, and
    wherein the cameras are installed at the particular area, and the perspective drawing further displays placement of the cameras.

3. The apparatus of claim 2, wherein the perspective drawing indicates a photographing range of each of the cameras, and
    wherein if photographing areas of two or more of the cameras overlap with one another, the perspective drawing indicates the overlapping area.

4. The apparatus of claim 1, wherein the perspective drawing is two-dimensional or three-dimensional.

5. The apparatus of claim 2, wherein, if the perspective drawing is three-dimensional, a height of the object is indicated on the perspective drawing based on the calculated horizontal distance.

6. The apparatus of claim 1, the at least one processor further configured to:
    track eyes or hands of the detected object; and
    generate the perspective drawing based on the images captured by the cameras,
    wherein the heat-map display is further configured to display on the perspective drawing a path via which eye or hand tracking is performed on the detected object, or the heat map according to a trace density of the detected object which is obtained by performing the eye or hand tracking.

7. The apparatus of claim 6, wherein the cameras are configured to exchange information with one another via a wired or wireless communication.

8. The apparatus of claim 6, the heat-map display is further configured to display on the perspective drawing the heat map indicating the trace density of the detected object.

9. The apparatus of claim 6, wherein the perspective drawing indicates information about the cameras.

10. The apparatus of claim 9, wherein the perspective view indicates a photographing range of each of the cameras, and
    wherein if photographing areas of two or more of the cameras overlap with one another, the perspective drawing indicates the overlapping area.

11. An apparatus for displaying a heat map on a perspective drawing, the apparatus comprising:
    at least one processor configured to:
    detect an object from images captured by a plurality of cameras having different orientations; and
    calculate a horizontal distance between the detected object and each of the cameras;
    an object display configured to display the detected object on the perspective drawing based on the calculated horizontal distance; and
    a heat-map display configured to display the heat map according to a trace density of at least one object including the object displayed on the perspective drawing,
    wherein the at least one processor is further configured to adjust a size of the detected object using the horizontal distance, and generate the perspective drawing on which the detected object, of which the size is adjusted, is shown, and configured to calculate a horizontal distance between the detected object and a camera among the cameras based on a height of a center of a lens of the camera on a ground surface and an angle between a virtual line connecting a bottommost end of the detected object and the center of the lens of the camera and an optical axis of the camera,
    wherein the optical axis of the camera is not parallel with the ground surface, and
    wherein the cameras are configured to exchange live view video signals between each other, and generate a perspective drawing based on the exchanged live view video signals.

12. A method of displaying a heat map on a perspective drawing, the method comprising:
    detecting an object from images captured by a plurality of cameras having different orientations;
    calculating a horizontal distance between the detected object and each of the cameras;
    displaying the detected object on the perspective drawing based on the calculated horizontal distance; and
    displaying the heat map according to a trace density of at least one object including the object displayed on the perspective drawing,
    wherein the displaying the detected object comprises adjusting a size of the detected object using the horizontal distance, and generating the perspective drawing on which the detected object, of which the size is adjusted, is shown, wherein the horizontal distance between the detected object and a camera among the cameras is calculated based on a height of a center of a lens of the camera on a ground surface and an angle between a virtual line connecting a bottommost end of the detected object and the center of the lens of the camera and an optical axis of the camera, and wherein the optical axis of the camera is not parallel with the ground surface, and wherein the cameras are configured to exchange live view video signals between each other, and generate a perspective drawing based on the exchanged live view video signals.

13. The method of claim 12, wherein the perspective drawing indicates a particular area where the cameras are installed, and the perspective drawing comprises information about the cameras.

14. The apparatus of claim 13, wherein the perspective drawing indicates a photographing range of each of the cameras,
wherein if photographing areas of two or more of the cameras overlap with one another, the perspective drawing indicates the overlapping area, and wherein the perspective drawing indicates a dead zone which is included in the particular area but is not included in photographing areas of the cameras.

15. The method of claim 12 further comprising:
tracking eyes or hands of the detected object;
generating the perspective drawing based on the images captured by the cameras; and
displaying on the perspective drawing a path via which eye or hand tracking is performed on the detected object, or displaying the heat map according to a trace density of the detected object which is obtained by performing the eye or hand tracking.

16. The method of claim 15, wherein the perspective view shows a photographing area of the cameras,
wherein if photographing areas of two or more of the cameras overlap with one another, the perspective drawing indicates the overlapping area.

17. A non-transitory computer readable recording medium having recorded thereon a program for executing the method of claim 12.

* * * * *